United States Patent
Niemi et al.

(10) Patent No.: US 10,897,701 B2
(45) Date of Patent: Jan. 19, 2021

(54) SUPPORT FOR NO SUPI OR NO NON-3GPP COVERAGE IN 5G MOBILE COMMUNICATIONS

(71) Applicant: MediaTek Singapore Pte. Ltd., Singapore (SG)

(72) Inventors: Marko Niemi, Oulu (FI); Matti Moisanen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/414,784

(22) Filed: May 17, 2019

(65) Prior Publication Data

US 2019/0357034 A1 Nov. 21, 2019

Related U.S. Application Data

(60) Provisional application No. 62/672,611, filed on May 17, 2018.

(51) Int. Cl.
*H04W 8/18* (2009.01)
*H04W 60/00* (2009.01)

(52) U.S. Cl.
CPC ............ *H04W 8/183* (2013.01); *H04W 60/00* (2013.01)

(58) Field of Classification Search
CPC .............................. H04W 8/183; H04W 60/00
USPC ....................................................... 455/418
See application file for complete search history.

(56) References Cited

U.S. PATENT DOCUMENTS

| 2019/0254094 | A1* | 8/2019 | Babu ..................... H04W 76/15 |
| 2019/0335330 | A1* | 10/2019 | Salkintzis ....... H04W 12/00514 |
| 2019/0394625 | A1* | 12/2019 | Kim ..................... H04W 72/10 |
| 2020/0145910 | A1* | 5/2020 | Jangid ................... H04W 60/00 |

FOREIGN PATENT DOCUMENTS

CN 107950056 A 4/2018

OTHER PUBLICATIONS

3GPP TSG-CT WG1 Meeting #106 Kochi (India), Oct. 23-27, 2017 C1-174327, 5GMM state machine and states over non-3GPP access in the UE, year 2014 (Year: 2017).*

(Continued)

*Primary Examiner* — Inder P Mehra
(74) *Attorney, Agent, or Firm* — Han IP PLLC; Andy M. Han (57) ABSTRACT

Examples pertaining to no subscription permanent identifier (SUPI) or no non-3GPP coverage in 5G mobile communications are described. A processor controls a communication device of a UE to connect to one or more wireless networks and receive one or more 5GS services via a 3GPP access and a non-3GPP access. The processor performs either a first procedure or a second procedure. The first procedure involves: (i) detecting either no Subscriber Identity Module (SIM) being inserted in the UE or a SIM inserted in the UE being invalid; and (ii) entering the UE into a 5G no-SUPI substate responsive to the detecting. The second procedure involves: (i) performing registration or determining that the UE is registered to one or more 5GS services over the non-3GPP access; (ii) detecting an absence of non-3GPP coverage; and (iii) entering the UE into a no access point available substate responsive to the detecting.

10 Claims, 5 Drawing Sheets

(56) References Cited

OTHER PUBLICATIONS

3GPP TSG-CT WG1 Meeting #106 Kochi (India), Oct. 23-27, 2017Title:.5GMM state machine and states over non-3GPP access in the network (Year: 2017).*
3GPP TSG-CT WG1 Meeting #106 Kochi (India), Oct. 23-27, 2017, c1-174327, 2017.*
3GPP TSG-CT WG1 Meeting #106 CI-year 174161 Kochi (India), Oct. 23-27, 2017, Year 2017.*
China National Intellectual Property Administration, International Search Report and Written Opinion for International Patent Application No. PCT/CN2019/087385, dated Aug. 6, 2019.
Qualcomm Incorporated, 5GMM state machine and states over non-3GPP access in the network, 3GPP TSG-CT WG1 Meeting #106, C1-174161, Kochi, India, Oct. 23-27, 2017, Feb. 11, 2020.
Qualcomm Incorporated et al., 5GMM state machine and states over non-3GPP access in the UE, GPP TSG-CT WG1 Meeting #106, C1-174327, Kochi, India, Oct. 23-27, 2017.

* cited by examiner

SUPPORT FOR NO SUPI OR NO NON-3GPP COVERAGE IN 5G MOBILE COMMUNICATIONS

CROSS REFERENCE TO RELATED PATENT APPLICATION(S)

The present disclosure is part of a non-provisional application claiming the priority benefit of U.S. Patent Application No. 62/672,611, filed on 17 May 2018. The content of aforementioned application is herein incorporated by reference in its entirety.

TECHNICAL FIELD

The present disclosure is generally related to mobile communications and, more particularly, to support for no subscription permanent identifier (SUPI) or no non-$3^{rd}$-Generation Partnership Project (non-3GPP) coverage in $5^{th}$ Generation (5G) mobile communications.

BACKGROUND

Unless otherwise indicated herein, approaches described in this section are not prior art to the claims listed below and are not admitted as prior art by inclusion in this section.

In current 3GPP specification for 5G New Radio (NR) mobile communications, among the substates that are specified some of them are not applicable to non-3GPP access. This means that non-3GPP access can be only in one of the main states such as NULL, DEREGISTERED.NORMAL-SERVICE, DEREGISTERED.ATTEMPTING-REGISTRATION, REGISTERED.NORMAL-SERVICE, 5G MM-REGISTERED.ATTEMPTING-REGISTRATION-UPDATE, REGISTERED-INITIATED, DEREGISTERED-INITIATED and SERVICE-REQUEST-INITIATED. While some particular 3GPP access-specific states (e.g., LIMITED-SERVICE, PLMN-SEARCH AND eCALL-INACTIVE) are not available for non-3GPP access, there may be an issue that some of the 5G Mobility Management (5GMM) substates are not available for non-3GPP access under the current 3GPP specification.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor controlling a communication device of a user equipment (UE) to connect to one or more wireless networks and receive one or more 5th-Generation System (5GS) services via either a 3GPP access or a non-3GPP access. The method may also involve the processor detecting either no Subscriber Identity Module (SIM) being inserted in the UE or a SIM inserted in the UE being invalid. The method may further involve the processor entering the UE into a 5G no-SUPI substate responsive to the detecting.

In one aspect, a method may involve a processor controlling a communication device of a UE to connect to one or more wireless networks via a 3GPP access and a non-3GPP access. The method may also involve the processor performing registration or determination that the UE is registered the UE to one or more 5GS services over the non-3GPP access. The method may further involve the processor detecting an absence of non-3GPP coverage. The method may additionally involve the processor entering the UE into a no access point available substate responsive to the detecting.

In one aspect, a method may involve a processor controlling a communication device of a UE to connect to one or more wireless networks and receive one or more 5GS services via a 3GPP access and a non-3GPP access. The method may also involve the processor performing either a first procedure or a second procedure. The first procedure may involve: (i) detecting either no SIM being inserted in the UE or a SIM inserted in the UE being invalid; and (ii) entering the UE into a 5G no-SUPI substate responsive to the detecting. The second procedure may involve: (i) performing registration or determination that the UE is registered the UE to one or more 5GS services over the non-3GPP access; (ii) detecting an absence of non-3GPP coverage; and (iii) entering the UE into a no access point available substate responsive to the detecting.

It is noteworthy that, although description provided herein may be in the context of certain radio access technologies, networks and network topologies such as New Radio (NR) or non-3GPP access in 5G system, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
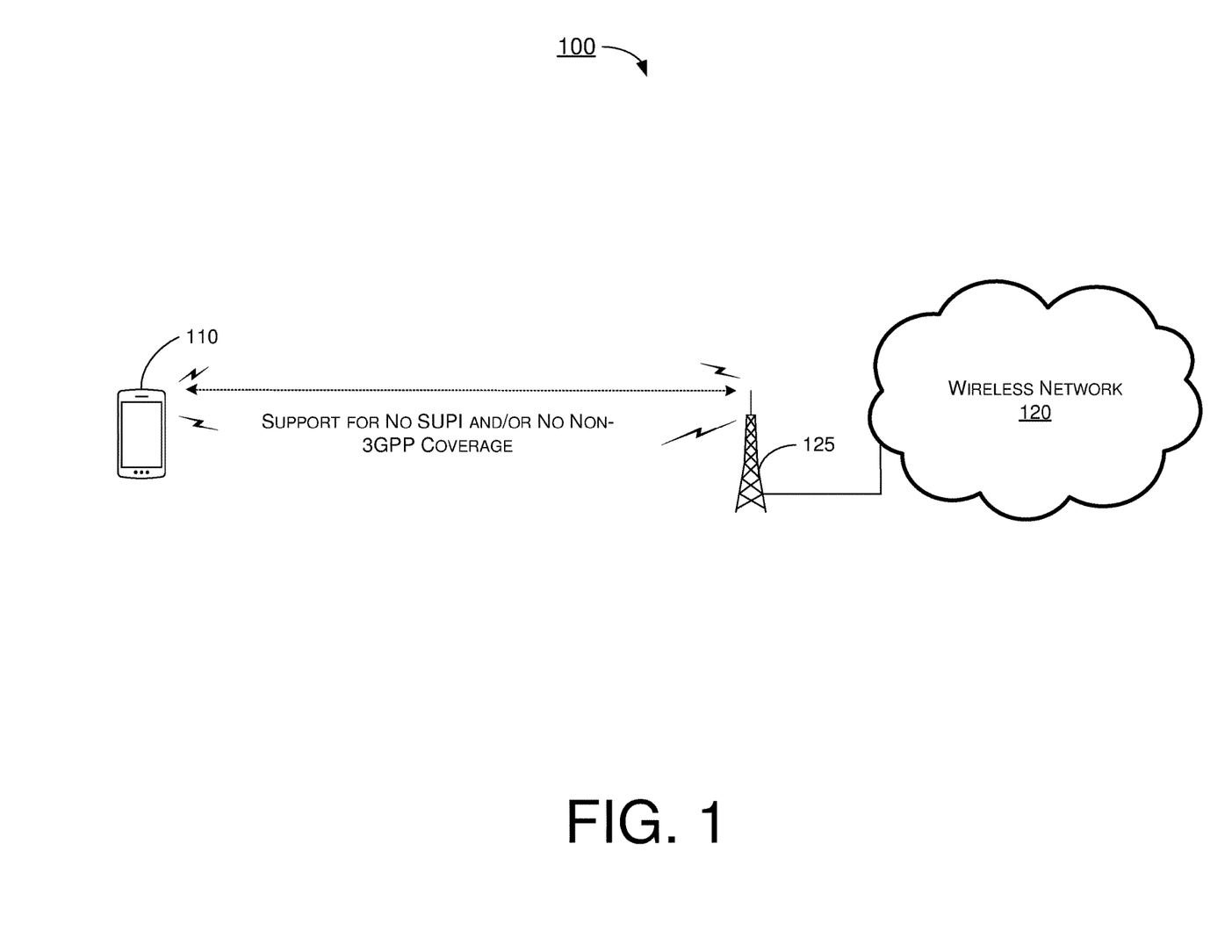
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network) via a base station 125 (e.g., a gNB or transmit-receive point (TRP)). In network environment 100, UE 110 and wireless network 120 may implement various schemes pertaining to support for no SUPI and/or no non-3GPP coverage in 5G mobile communications in accordance with the present disclosure. For instance, UE 110 may connect to one or more wireless networks, including and/or via network 120, to receive one or more 5G System (5GS) services via a 3GPP access and a non-3GPP access (e.g., via Wi-Fi in accordance with the Institute of Electrical and Electronics Engineers (IEEE) 802.11 specifications). The follow description of various solutions in accordance with the present disclosure is provided with reference to FIG. 1.

Under current 3GPP specification, SUPI, as a 5G subscription permanent identifier, is the identifier for a 5G-capable UE (e.g., UE 110) and may be seen as equivalent to international mobile subscriber identifier (IMSI) for $4^{th}$ Generation (4G) and legacy UEs. 3GPP access and non-3GPP access are enablers for establishing radio resource control (RRC) connections and non-access stratum (NAS) signaling connections between UE 110 and a core network. If no universal subscriber identity (USIM) or subscriber identify module (SIM) is present in UE 110, or if an inserted USIM/SIM is deemed invalid by UE 110, then an appropriate substate would be NO-SUPI. For a non-3GPP 5GMM state machine in UE 110, however, it may be problematic for UE 110 to find a suitable state/substate if the USIM/SIM is considered invalid while NO-SUPI is not applicable. The most suitable state would be the main state 5GMM-NULL. However, under current 3GPP specification, the 5GMM-NULL state would indicate that 5GS services are disabled in UE 110, yet this is not the case. Another main state, DEREGISTERED, without additional information would also be ambiguous as it could be interpreted as a state to start initial registration, which cannot be done if UE 110 has no valid USIM/SIM.

Under a proposed scheme in accordance with the present disclosure, the existing substate 5GMM-DEREGISTERED.NO-SUPI may be modified so that it may be applicable also for non-3GPP 5GMM. Accordingly, it would not be necessary to create a new substate for non-3GPP access. For instance, for 3GPP access, UE 110 may choose and enter the substate 5GMM-DEREGISTERED.NO-SUPI in an event that UE 110 has no valid subscriber data available (e.g., due to no USIM/SIM being available or due to the USIM/SIM inserted being considered invalid by UE 110) and an access point has been selected for non-3GPP access. Additionally, for non-3GPP access, UE 110 may choose and enter the substate 5GMM-DEREGISTERED.NO-SUPI in an event that UE 110 has no valid subscriber data available (e.g., due to no USIM/SIM being available or due to the USIM/SIM inserted being considered invalid by UE 110).

Under current 3GPP specification, the 3GPP 5GMM state machine would enter the NO-CELL-AVAILABLE substate after an intensive Public Land Mobile Network (PLMN) search when no 5G cell could be selected or when UE 110 is operating in a single mode and does intersystem change to S1 mode (e.g., leaving N1 mode behind and remaining REGISTERED in both systems). In an event that 5GS services are enabled and UE 110 supports non-3GPP access, the non-3GPP 5GMM state machine in UE 110 should leave the 5GMM-NULL state and start to establish NAS signaling connection and then initiate registration in order to reach REGISTERED state. However, it is not defined in current 3GPP specification as to which state 5GMM should select if there is no non-3GPP coverage. In an event that UE 110 is registered to 5GS services over a non-3GPP access but non-3GPP coverage is lost, then 5GMM would still be registered (e.g., until non-3GPP deregistration timer in UE 110 expires). The non-3GPP 5GMM state machine in UE 110 should leave the state 5GMM-REGISTERED.NORMAL-SERVICE. However, it is also not defined in current 3GPP specification as to which state 5GMM should select.

In the above example scenario, the substate 5GMM-DEREGISTERED.NORMAL-SERVICE would mean, to the non-3GPP 5GMM state machine in UE 110, that a cell has been found and initial registration can be performed. However, this is not a sufficient substate if there is no non-3GPP coverage. Similarly, the substate 5GMM-DEREGISTERED.ATTEMPTING-REGISTRATION would mean, to the non-3GPP 5GMM state machine in UE 110, that there is an initial registration failure due to missing response from network 120. However, this is also not a sufficient substate if there is no non-3GPP coverage and initial registration has not been started at all.

Thus, if the non-3GPP 5GMM state machine in UE 110 cannot enter either of the aforementioned substates due to lack of non-3GPP coverage, UE 110 would remain in the DEREGISTERED state without additional information. Moreover, for the state machine itself and upper layers, there would remain ambiguity as to whether the non-3GPP state machine is intentionally staying in the DEREGISTERED state (e.g., due to NO-SUPI or due to power saving reasons) or whether UE 110 is actively looking for service(s).

Under a proposed scheme in accordance with the present disclosure, the existing substates 5GMM-DEREGISTERED.NO-CELL-AVAILABLE and 5GMM-REGISTERED.NO-CELL-AVAILABLE may be modified so that they may be applicable also for the non-3GPP 5GMM. For instance, for 3GPP access, the modified 5G MM-DEREGISTERED.NO-CELL-AVAILABLE substate may indicate that no 5G cell can be selected. UE 110 may enter this substate after a first intensive search results in failure when in the substate 5GMM-DEREGISTERED.PLMN-SEARCH. UE 110 may search for one or more cells at a low rhythm, and no 5GS service is offered. Additionally, for 3GPP access, the modified 5GMM-REGISTERED.NO-CELL-AVAILABLE substate may indicate that 5G coverage has been lost or that a Mobile Initiated Connection Only (MICO) mode is active in UE 110. In event that MICO mode is active, UE 110 may deactivate the MICO mode at any time by activating the access stratum (AS) layer when UE 110 needs to send UE-originated signaling or user data.

Otherwise, UE 110 may not initiate any 5GMM procedure except for cell and PLMN reselection.

Moreover, for non-3GPP access, the 5GMM-DEREGISTERED.NO-CELL-AVAILABLE substate may be renamed as 5GMM-DEREGISTERED.NO-ACCESS-POINT-AVAILABLE. UE 110 may enter the substate 5GMM-DEREGISTERED.NO-ACCESS-POINT-AVAILABLE when there is either no 5G coverage over non-3GPP access or no non-3GPP 5G access can be selected. In addition, this substate may also indicate that no 5GS service is offered. For example, UE 110 may enter this substate in an event that N1 mode (including non-3GPP access) is just enabled and UE 110 can register in non-3GPP access when non-3GPP access becomes available. Furthermore, for non-3GPP access, the 5GMM-REGISTERED.NO-CELL-AVAILABLE substate may be renamed as 5GMM-REGISTERED.NO-ACCESS-POINT-AVAILABLE. UE 110 may enter the substate 5GMM-REGISTERED.NO-ACCESS-POINT-AVAILABLE when there is either no 5G coverage over non-3GPP access or no non-3GPP 5G access can be selected. For example, in this substate, a non-3GPP deregistration timer may be running as UE 110 has entered in 5GMM-IDLE mode over the non-3GPP access (e.g., due to non-3GPP coverage being lost). UE 110 may return to REGISTERED.NORMAL-SERVICE state when UE 110 is back in non-3GPP coverage.

Under another proposed scheme in accordance with the present disclosure, a new substate corresponding to each of 5GMM-DEREGISTERED.NO-CELL-AVAILABLE and 5GMM-REGISTERED.NO-CELL-AVAILABLE for non-3GPP 5GMM may be defined or otherwise added in the 3GPP specification. For instance, UE 110 may enter a 5GMM deregistered no non-3GPP coverage (5GMM-DEREGISTERED.NO-N3GPP-COVERAGE) substate, a waiting-for-access (WAITING-FOR-ACCESS) substate, or a no non-3GPP access point available (NO-N3GPP-ACCESS-POINT-AVAILABLE) substate when there is either no 5G coverage over the non-3GPP access or there is no non-3GPP 5G access that can be selected, with no 5GS service offered. Similarly, UE 110 may enter a 5GMM registered no non-3GPP coverage (5GMM-REGISTERED.NO-N3GPP-COVERAGE) substate, a waiting-for-access (WAITING-FOR-ACCESS) substate, or a no non-3GPP access point available (NO-N3GPP-ACCESS-POINT-AVAILABLE) substate when there is either no 5G coverage over the non-3GPP access or no non-3GPP 5G access can be selected.

Illustrative Implementations

Figure 2:
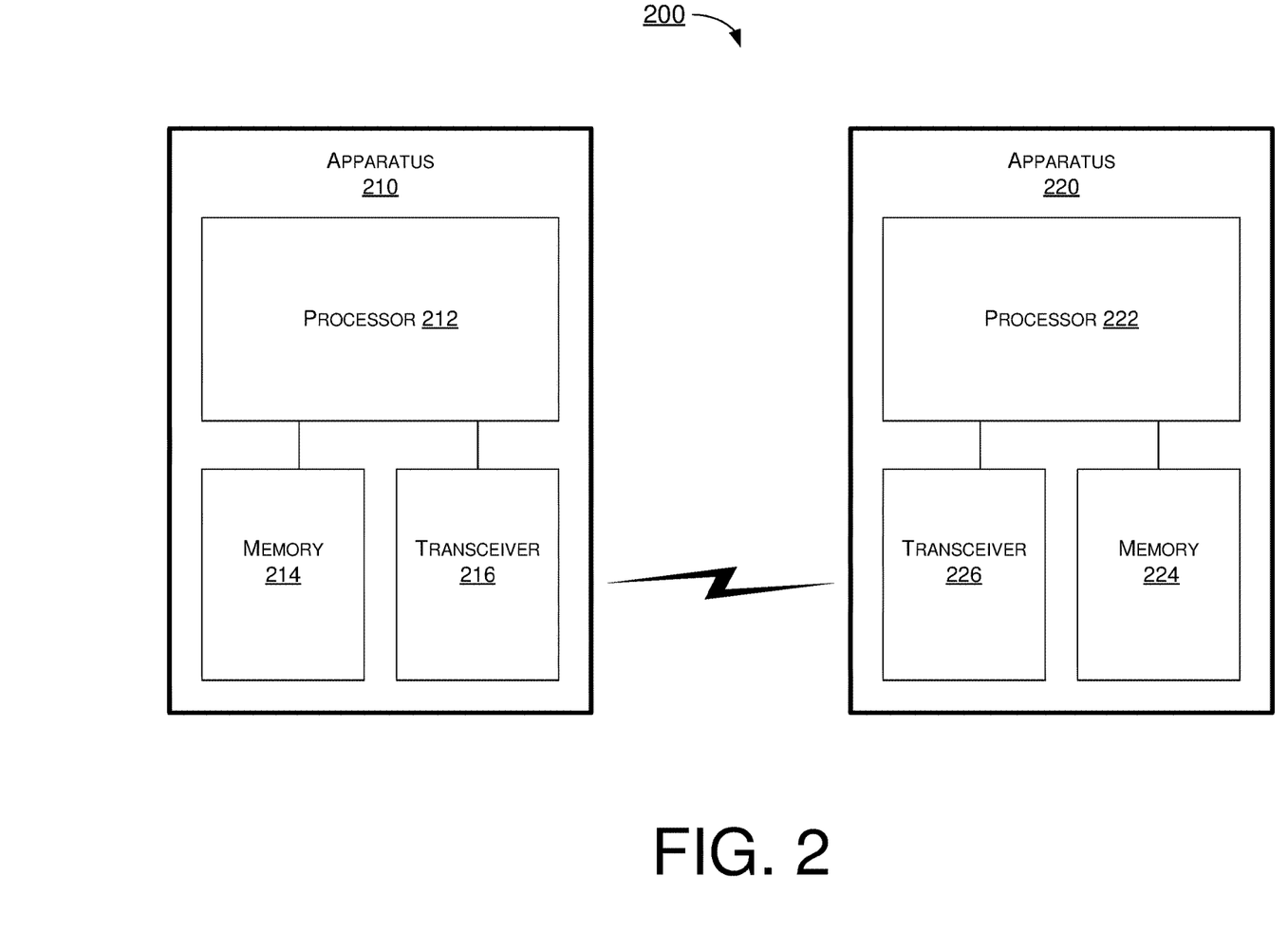
FIG. 2 is a block diagram of an example communication system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to support for no SUPI or no non-3GPP coverage in 5G mobile communications, including the various schemes described above with respect to various proposed designs, concepts, schemes, systems and methods described above, including network environment 100, as well as processes 300, 400 and 500 described below.

Each of apparatus 210 and apparatus 220 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to support for no SUPI or no non-3GPP coverage in 5G mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 210 as a UE (e.g., UE 110), the same is also applicable to apparatus 220 as a network node or base station such as a gNB, TRP or eNodeB (e.g., network node 125) of a wireless network (e.g., wireless network 120) such as a 5G NR mobile network.

In one aspect, processor 212 of apparatus 210 may control transceiver 216 to connect to one or more wireless networks (e.g., via apparatus 220) and receive one or more 5GS services via either a 3GPP access or a non-3GPP access. Additionally, processor 212 may detect either no SIM being inserted in apparatus 210 or a SIM inserted in apparatus 210 being invalid. Moreover, processor 212 may enter apparatus 210 into a 5G no-SUPI substate responsive to the detecting.

In some implementations, in entering apparatus 210 into the 5G no-SUPI substate, processor 212 may perform some operations. For instance, processor 212 may determine that a predefined condition exists. Additionally, processor 212 may operate apparatus 210 in a 5GMM deregistered no-SUPI (5GMM-DEREGISTERED.NO-SUPI) substate for the 3GPP access. In such cases, the predefined condition may include: (i) an access point having been selected for the non-3GPP access; and (ii) either apparatus 210 having no valid subscriber data available or apparatus 210 having an invalid SIM.

In some implementations, in entering apparatus 210 into the 5G no-SUPI substate, processor 212 may perform some operations. For instance, processor 212 may determine that a predefined condition exists. Moreover, processor 212 may operate apparatus 210 in a 5G Mobility Management (5GMM) deregistered no-SUPI (5GMM-DEREGISTERED.NO-SUPI) substate for the non-3GPP access. In such cases, the predefined condition may include either apparatus 210 having no valid subscriber data available or apparatus 210 having an invalid SIM.

In another aspect, processor 212 may control transceiver 216 to connect to one or more wireless networks via a 3GPP access and a non-3GPP access. Additionally, processor 212 may register or determine that apparatus 210 is already registered to one or more 5GS services over the non-3GPP access. Moreover, processor 212 detecting an absence of non-3GPP coverage. Furthermore, processor 212 may enter apparatus 210 into a no access point available substate responsive to the detecting In some implementations, in an event that apparatus 210 is not yet registered over the non-3GPP access and is in process of registering, in entering apparatus 210 into the no access point available substate, processor 212 may perform certain operations. For instance, processor 212 may perform, for the non-3GPP access, a search for one or more access points in 5GS which results in failure with no 5G core network available over the non-3GPP access and no 5GS service. Moreover, processor 212 may enter apparatus 210 into a 5GMM deregistered no cell available (5GMM-DEREGISTERED.NO-CELL-AVAILABLE) substate for the non-3GPP access.

In some implementations, in entering apparatus 210 into the no access point available substate, processor 212 may perform some other operations. For instance, processor 212 may detect, for the non-3GPP access, that there is no 5G coverage over the non-3GPP access, no non-3GPP 5G access being available for selection, and no 5GS service. Moreover, processor 212 may enter apparatus 210 into a 5GMM deregistered no access point available (5GMM-DEREGISTERED.NO-CELL-AVAILABLE) substate for the non-3GPP access. In such cases, in entering apparatus 210 into the 5GMM deregistered no access point available substate, processor 212 may enter apparatus 210 into the 5GMM deregistered no access point available substate in an event that N1 mode is enabled and the processor determines to register apparatus 210 in the non-3GPP access when the non-3GPP access becomes available.

Alternatively, in entering apparatus 210 into the no access point available substate, processor 212 may perform certain operations. For instance, processor 212 may detect either that 5G coverage has been lost or that a Mobile Initiated Connection Only (MICO) mode is active in apparatus 210. Additionally, processor 212 may enter apparatus 210 into a 5GMM registered no access point available (5GMM-REGISTERED.NO-CELL-AVAILABLE) substate for the 3GPP access.

Still alternatively, in an event that apparatus 210 is registered over the non-3GPP access, in entering apparatus 210 into the no access point available substate, processor 212 may perform some operations. For instance, processor 212 may detect either that there is no 5G coverage over the non-3GPP access or that non-3GPP 5G access cannot be selected. Moreover, processor 212 may enter apparatus 210 into a 5GMM registered no access point available (5GMM-REGISTERED.NO-CELL-AVAILABLE) substate for the non-3GPP access.

In some implementations, processor 212 may perform additional operations. For instance, processor 212 may detect a presence of the non-3GPP coverage. Furthermore, processor 212 may return apparatus 210 to a registered normal service (REGISTERED.NORMAL-SERVICE) substate responsive to the detecting of the non-3GPP coverage. In such cases, when in the 5GMM registered no access point available substate, a non-3GPP deregistration timer in apparatus 210 may be running as apparatus 210 enters into a 5G Mobility Management (5GMM) idle (5GMM-IDLE) mode over the non-3GPP access.

In some implementations, in entering apparatus 210 into the no access point available substate, processor 212 may perform other operations. For instance, processor 212 may enable 5GS services in apparatus 210. Additionally, when registering, processor 212 may detect no 5GS service and either that there is no 5G coverage over the non-3GPP access or that non-3GPP 5G access cannot be selected. Moreover, processor 212 may enter apparatus 210 into a 5GMM deregistered no non-3GPP coverage (5GMM-DEREGISTERED.NO-N3GPP-COVERAGE) substate, a waiting-for-access (WAITING-FOR-ACCESS) substate, a no access point available (5GMM-DEREGISTERED.NO-ACCESS-POINT-AVAILABLE) substate, or a no non-3GPP access point available (NO-N3GPP-ACCESS-POINT-AVAILABLE) substate for the non-3GPP access.

Alternatively, in entering apparatus 210 into the no access point available substate, processor 212 may perform certain operations. For instance, when registered, processor 212 may detect either that there is no 5G coverage over the non-3GPP access or that non-3GPP 5G access cannot be selected. Moreover, processor 212 may enter apparatus 210 into a 5GMM registered no non-3GPP coverage (5GMM-REGISTERED.NO-N3GPP-COVERAGE) substate, a waiting-for-access (WAITING-FOR-ACCESS) substate, a no access point available (NO-ACCESS-POINT-AVAILABLE) substate, or a no non-3GPP access point available (NO-N3GPP-ACCESS-POINT-AVAILABLE) substate for the non-3GPP access.

In yet another aspect, processor 212 of apparatus 210 may control transceiver 216 to connect to one or more wireless networks (e.g., via apparatus 220) and receive one or more 5GS services via a 3GPP access and a non-3GPP access. Moreover, processor 212 may perform either a first procedure or a second procedure. The first procedure may involve a number of operations, including: (i) detecting either no SIM being inserted in apparatus 210 or a SIM inserted in apparatus 210 being invalid; and (ii) entering apparatus 210 into a 5G no-SUPI substate responsive to the detecting. The second procedure may involve a number of operations, including: (i) registering or determining that apparatus 210 is already registered to one or more 5GS services over the non-3GPP access; (ii) detecting an absence of non-3GPP coverage; and (iii) entering apparatus 210 into a no access point available substate responsive to the detecting.

In some implementations, in entering apparatus 210 into the 5G no-SUPI substate, processor 212 may perform some operations. For instance, processor 212 may determine that a predefined condition exists. Additionally, processor 212 may operate apparatus 210 in a 5GMM deregistered no-SUPI (5GMM-DEREGISTERED.NO-SUPI) substate for the 3GPP access. In such cases, the predefined condition may include: (i) an access point having been selected for the non-3GPP access; and (ii) either apparatus 210 having no valid subscriber data available or apparatus 210 having an invalid SIM.

In some implementations, in entering apparatus 210 into the 5G no-SUPI substate, processor 212 may perform some operations. For instance, processor 212 may determine that a predefined condition exists. Moreover, processor 212 may operate apparatus 210 in a 5GMM deregistered no-SUPI (5GMM-DEREGISTERED.NO-SUPI) substate for the non-3GPP access. In such cases, the predefined condition may include either apparatus 210 having no valid subscriber data available or apparatus 210 having an invalid SIM.

In some implementations, in an event that apparatus 210 is not yet registered over the non-3GPP access and is in process of registering, in entering apparatus 210 into the no access point available substate, processor 212 may perform some operations. For instance, processor 212 may perform, for the non-3GPP access, a search for one or more access points in 5GS which results in failure with no 5G core network available over the non-3GPP access and no 5GS service. Furthermore, processor 212 may enter apparatus 210 into a 5GMM deregistered no cell available (5GMM-DEREGISTERED.NO-CELL-AVAILABLE) substate for the non-3GPP access.

In some implementations, in entering apparatus 210 into the no access point available substate, processor 212 may perform some operations. For instance, processor 212 may detect, for the non-3GPP access, that there is no 5G coverage over the non-3GPP access, no non-3GPP 5G access being available for selection, and no 5GS service. Additionally, processor 212 may enter apparatus 210 into a 5GMM deregistered no access point available (5GMM-DEREGISTERED.NO-CELL-AVAILABLE) substate for the non-3GPP access. In such cases, in entering apparatus 210 into the 5GMM deregistered no access point available substate, processor 212 may enter apparatus 210 into the 5GMM deregistered no access point available substate in an event that N1 mode is enabled and the processor determines to register apparatus 210 in the non-3GPP access when the non-3GPP access becomes available.

In some implementations, in entering apparatus 210 into the no access point available substate, processor 212 may perform some operations. For instance, processor 212 may detect either that 5G coverage has been lost or that a MICO mode is active in apparatus 210. Moreover, processor 212 may enter apparatus 210 into a 5GMM registered no cell available (5GMM-REGISTERED.NO-CELL-AVAILABLE) substate for the 3GPP access.

In some implementations, in an event that apparatus 210 is registered over the non-3GPP access, in entering apparatus 210 into the no access point available substate, processor 212 may perform some operations. For instance, processor 212 may detect either that there is no 5G coverage over the non-3GPP access or that non-3GPP 5G access cannot be selected. Additionally, processor 212 may enter apparatus 210 into a 5GMM registered no access point available (5GMM-REGISTERED.NO-CELL-AVAILABLE) substate for the non-3GPP access. Moreover, processor 212 may detect a presence of the non-3GPP coverage. Furthermore, processor 212 may return apparatus 210 to a registered normal service (REGISTERED.NORMAL-SERVICE) substate responsive to the detecting of the non-3GPP coverage. In such cases, when in the 5GMM registered no access point available substate, a non-3GPP deregistration timer in apparatus 210 may be running as apparatus 210 enters into a 5GMM idle (5GMM-IDLE) mode over the non-3GPP access.

In some implementations, in entering apparatus 210 into the no access point available substate, processor 212 may perform some operations. For instance, processor 212 may enable 5GS services in apparatus 210. Moreover, when registering, processor 212 may detect no 5GS service and either that there is no 5G coverage over the non-3GPP access or that non-3GPP 5G access cannot be selected. Furthermore, processor 212 may enter apparatus 210 into a 5GMM deregistered no non-3GPP coverage (5GMM-DEREGISTERED.NO-N3GPP-COVERAGE) substate, a waiting-for-access (WAITING-FOR-ACCESS) substate, a no access point available (5GMM-DEREGISTERED.NO-ACCESS-POINT-AVAILABLE) substate, or a no non-3GPP access point available (NO-N3GPP-ACCESS-POINT-AVAILABLE) substate for the non-3GPP access.

In some implementations, in entering apparatus 210 into the no access point available substate, processor 212 may perform some operations. For instance, when registered, processor 212 may detect either that there is no 5G coverage over the non-3GPP access or that non-3GPP 5G access cannot be selected. Additionally, processor 212 may enter apparatus 210 into a 5GMM registered no non-3GPP coverage (5GMM-REGISTERED.NO-N3GPP-COVERAGE) substate, a waiting-for-access (WAITING-FOR-ACCESS) substate, a no access point available (NO-ACCESS-POINT-AVAILABLE) substate, or a no non-3GPP access point available (NO-N3GPP-ACCESS-POINT-AVAILABLE) substate for the non-3GPP access.

Illustrative Processes

Figure 3:
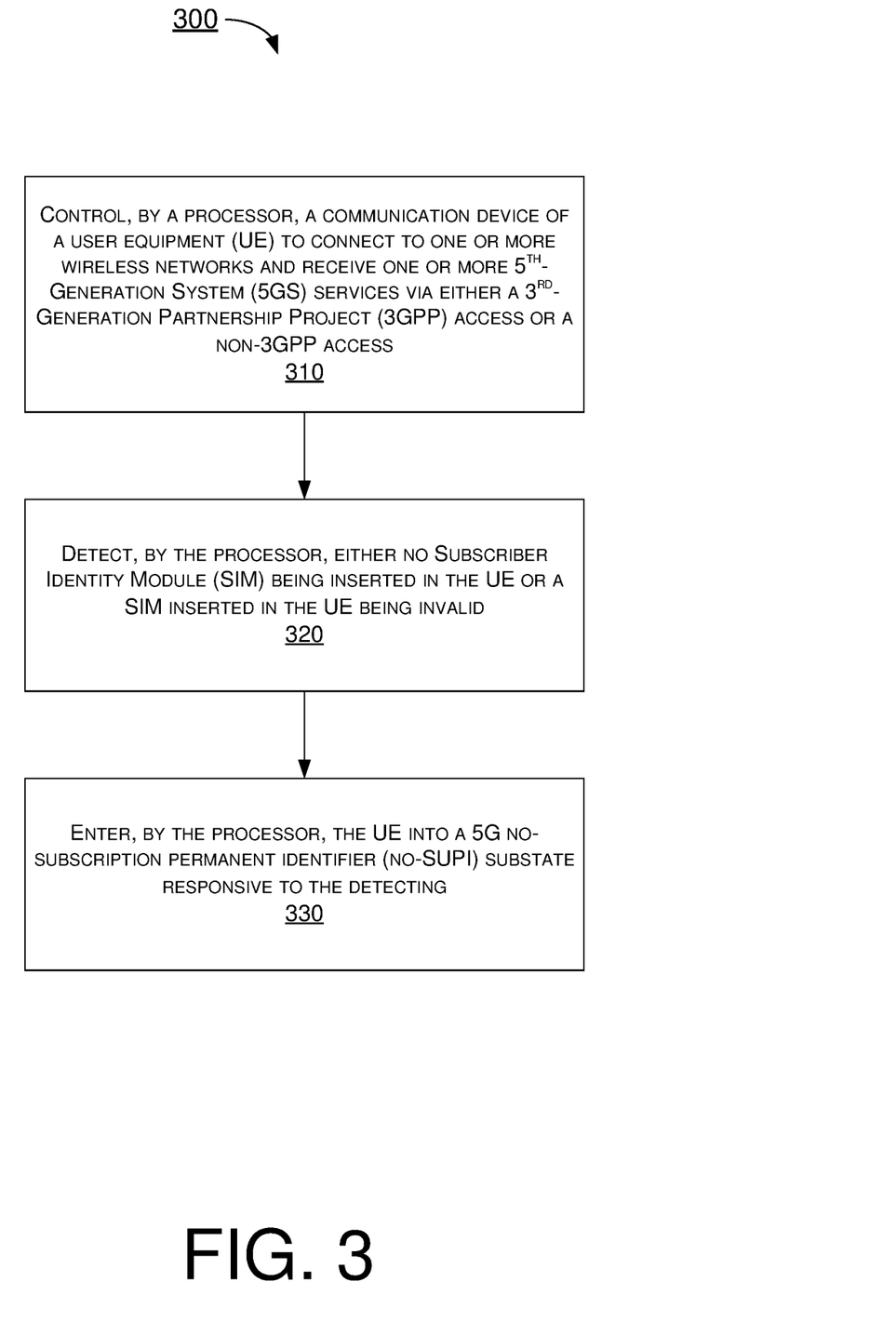
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including network environment 100. More specifically, process 300 may represent an aspect of the proposed concepts and schemes pertaining to support for no SUPI or no non-3GPP coverage in 5G mobile communications. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a network node or base station (e.g., network node 125) of a wireless network (e.g., wireless network 120). Process 300 may begin at block 310.

At 310, process 300 may involve processor 212 of apparatus 210 controlling a communication device (e.g., transceiver 216) of apparatus 210 to connect to one or more wireless networks (e.g., via apparatus 220) and receive one or more 5GS services via either a 3GPP access or a non-3GPP access. Process 300 may proceed from 310 to 320.

At 320, process 300 may involve processor 212 detecting either no SIM being inserted in apparatus 210 or a SIM inserted in apparatus 210 being invalid. Process 300 may proceed from 320 to 330.

At 330, process 300 may involve processor 212 entering apparatus 210 into a 5G no-SUPI substate responsive to the detecting.

In some implementations, in entering apparatus 210 into the 5G no-SUPI substate, process 300 may involve processor 212 performing some operations. For instance, process 300 may involve processor 212 determining that a predefined condition exists. Additionally, process 300 may involve processor 212 operating apparatus 210 in a 5GMM deregistered no-SUPI (5GMM-DEREGISTERED.NO-SUPI) substate for the 3GPP access. In such cases, the predefined condition may include: (i) an access point having been selected for the non-3GPP access; and (ii) either apparatus 210 having no valid subscriber data available or apparatus 210 having an invalid SIM.

In some implementations, in entering apparatus 210 into the 5G no-SUPI substate, process 300 may involve processor 212 performing some operations. For instance, process 300 may involve processor 212 determining that a predefined condition exists. Moreover, process 300 may involve processor 212 operating apparatus 210 in a 5G Mobility Management (5GMM) deregistered no-SUPI (5GMM-DEREGISTERED.NO-SUPI) substate for the non-3GPP access. In such cases, the predefined condition may include either apparatus 210 having no valid subscriber data available or apparatus 210 having an invalid SIM.

Figure 4:
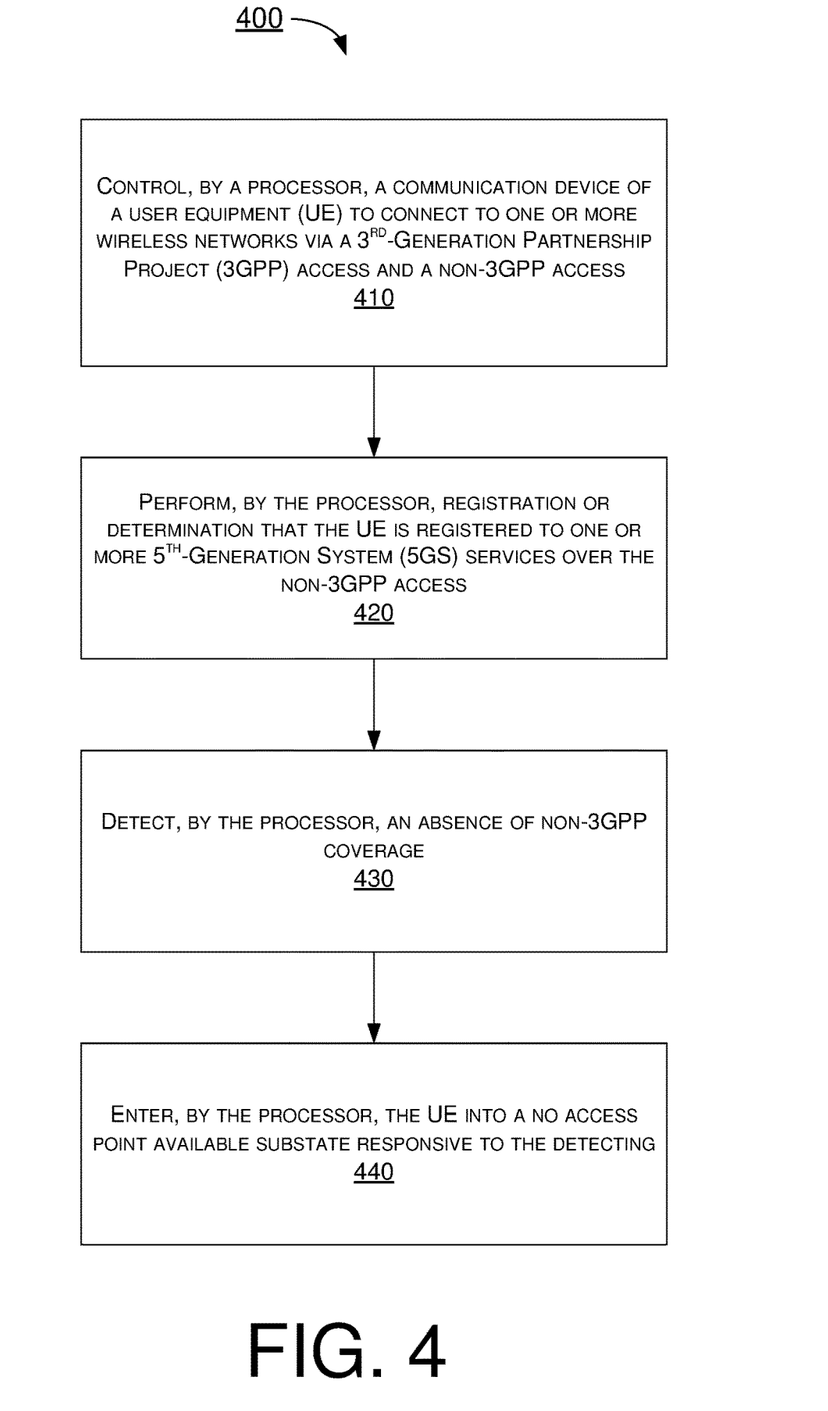
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including network environment 100. More specifically, process 400 may represent an aspect of the proposed concepts and schemes pertaining to support for no SUPI or no non-3GPP coverage in 5G mobile communications. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a network node or base station (e.g., network node 125) of a wireless network (e.g., wireless network 120). Process 400 may begin at block 410.

At 410, process 400 may involve processor 212 of apparatus 210 controlling a communication device (e.g., transceiver 216) of apparatus 210 to connect to one or more wireless networks via a 3GPP access and a non-3GPP access. Process 400 may proceed from 410 to 420.

At 420, process 400 may involve processor 212 performing registration or determination that the UE is registered apparatus 210 to one or more 5GS services over the non-3GPP access. Process 400 may proceed from 420 to 430.

At 430, process 400 may involve processor 212 detecting an absence of non-3GPP coverage. Process 400 may proceed from 430 to 440.

At 440, process 400 may involve processor 212 entering apparatus 210 into a no access point available substate responsive to the detecting In some implementations, in an event that apparatus 210 is not yet registered over the non-3GPP access and is performing the registration, in entering apparatus 210 into the no access point available substate, process 400 may involve processor 212 performing certain operations. For instance, process 400 may involve processor 212 performing, for the non-3GPP access, a search for one or more access points in 5GS which results in failure with no 5G core network available over the non-3GPP access and no 5GS service. Moreover, process 400 may involve processor 212 entering apparatus 210 into a 5GMM deregistered no cell available (5GMM-DEREGISTERED.NO-CELL-AVAILABLE) substate for the non-3GPP access.

In some implementations, in entering apparatus 210 into the no access point available substate, process 400 may involve processor 212 performing some other operations. For instance, process 400 may involve processor 212 detecting, for the non-3GPP access, that there is no 5G coverage over the non-3GPP access, no non-3GPP 5G access being available for selection, and no 5GS service. Moreover, process 400 may involve processor 212 entering apparatus 210 into a 5GMM deregistered no access point available (5GMM-DEREGISTERED.NO-CELL-AVAILABLE) substate for the non-3GPP access. In such cases, in entering apparatus 210 into the 5GMM deregistered no access point available substate, process 400 may involve processor 212 entering apparatus 210 into the 5GMM deregistered no access point available substate in an event that N1 mode is enabled and the processor determines to register apparatus 210 in the non-3GPP access when the non-3GPP access becomes available.

Alternatively, in entering apparatus 210 into the no access point available substate, process 400 may involve processor 212 performing certain operations. For instance, process 400 may involve processor 212 detecting either that 5G coverage has been lost or that a Mobile Initiated Connection Only (MICO) mode is active in apparatus 210. Additionally, process 400 may involve processor 212 entering apparatus 210 into a 5GMM registered no access point available (5GMM-REGISTERED.NO-CELL-AVAILABLE) substate for the 3GPP access.

Still alternatively, in an event that apparatus 210 is registered over the non-3GPP access, in entering apparatus 210 into the no access point available substate, process 400 may involve processor 212 process 400 may involve processor 212 detecting either that there is no 5G coverage over the non-3GPP access or that non-3GPP 5G access cannot be selected. Moreover, process 400 may involve processor 212 entering apparatus 210 into a 5GMM registered no access point available (5GMM-REGISTERED.NO-CELL-AVAILABLE) substate for the non-3GPP access.

In some implementations, process 400 may involve processor 212 performing additional operations. For instance, process 400 may involve processor 212 detecting a presence of the non-3GPP coverage. Furthermore, process 400 may involve processor 212 returning apparatus 210 to a registered normal service (REGISTERED.NORMAL-SERVICE) substate responsive to the detecting of the non-3GPP coverage. In such cases, when in the 5GMM registered no access point available substate, a non-3GPP deregistration timer in apparatus 210 may be running as apparatus 210 enters into a 5G Mobility Management (5GMM) idle (5GMM-IDLE) mode over the non-3GPP access.

In some implementations, in entering apparatus 210 into the no access point available substate, process 400 may involve processor 212 performing other operations. For instance, process 400 may involve processor 212 enabling 5GS services in apparatus 210. Additionally, when registering, process 400 may involve processor 212 detecting no 5GS service and either that there is no 5G coverage over the non-3GPP access or that non-3GPP 5G access cannot be selected. Moreover, process 400 may involve processor 212 entering apparatus 210 into a 5GMM deregistered no non-3GPP coverage (5GMM-DEREGISTERED.NO-N3GPP-COVERAGE) substate, a waiting-for-access (WAITING-FOR-ACCESS) substate, a no access point available (5GMM-DEREGISTERED.NO-ACCESS-POINT-AVAILABLE) substate, or a no non-3GPP access point available (NO-N3GPP-ACCESS-POINT-AVAILABLE) substate for the non-3GPP access.

Alternatively, in entering apparatus 210 into the no access point available substate, process 400 may involve processor 212 performing certain operations. For instance, when registered, process 400 may involve processor 212 detecting either that there is no 5G coverage over the non-3GPP access or that non-3GPP 5G access cannot be selected. Moreover, process 400 may involve processor 212 entering apparatus 210 into a 5GMM registered no non-3GPP coverage (5GMM-REGISTERED.NO-N3GPP-COVERAGE) substate, a waiting-for-access (WAITING-FOR-ACCESS) substate, a no access point available (NO-ACCESS-POINT-AVAILABLE) substate, or a no non-3GPP access point available (NO-N3GPP-ACCESS-POINT-AVAILABLE) substate for the non-3GPP access.

Figure 5:
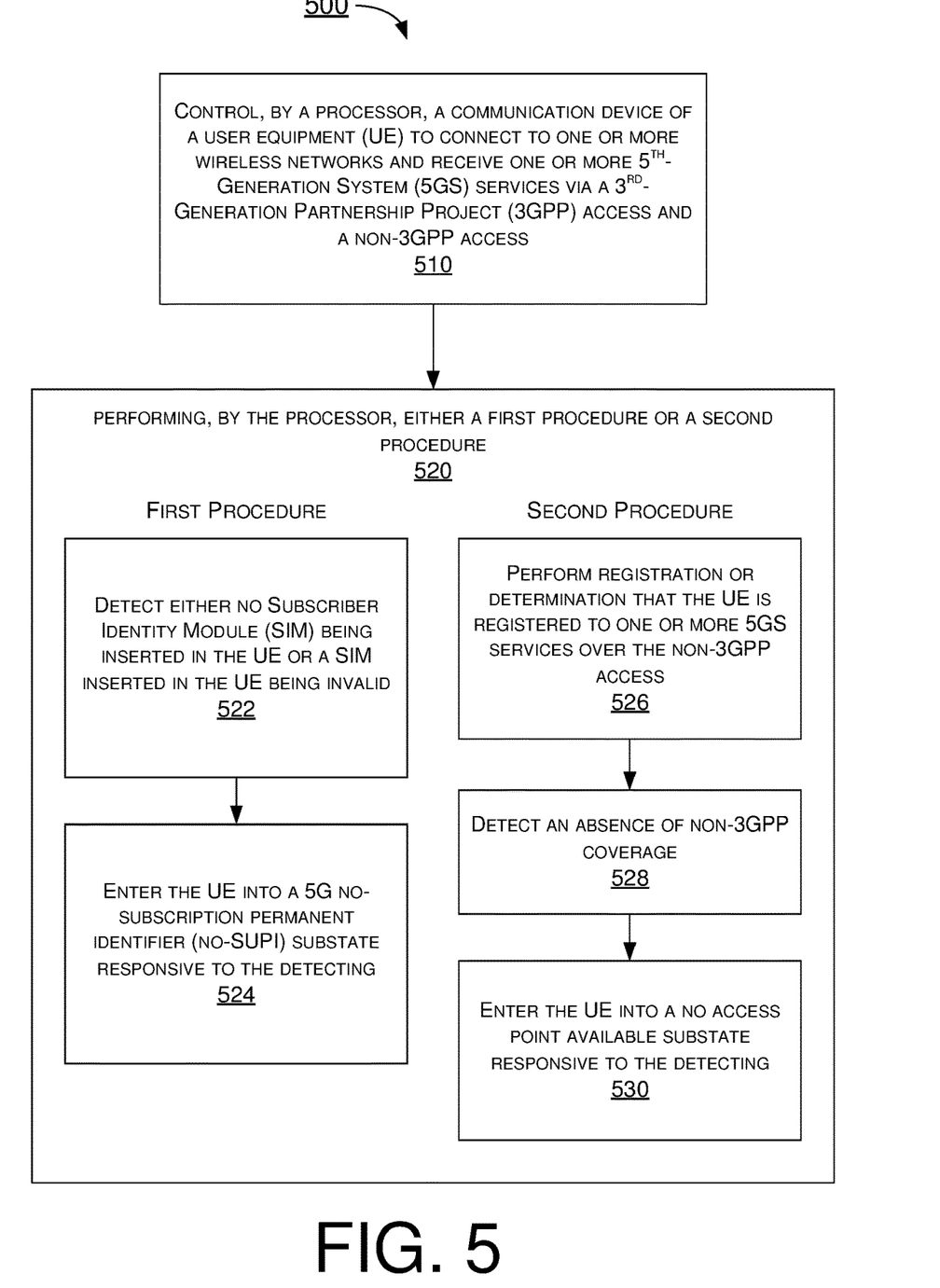
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including network environment 100. More specifically, process 500 may represent an aspect of the proposed concepts and schemes pertaining to support for no SUPI or no non-3GPP coverage in 5G mobile communications. Process 500 may include one or more operations, actions, or functions as illustrated by one or more of blocks 510 and 520 as well as sub-blocks 522, 524, 526, 528 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 210 and apparatus 220 as well as any variations thereof. Solely for illustrative purposes and without limiting the scope, process 500 is described below in the context of apparatus 210 as a UE (e.g., UE 110) and apparatus 220 as a network node or base station (e.g., network node 125) of a wireless network (e.g., wireless network 120). Process 500 may begin at block 510.

At 510, process 500 may involve processor 212 of apparatus 210 controlling a communication device (e.g., transceiver 216) of apparatus 210 to connect to one or more wireless networks (e.g., via apparatus 220) and receive one or more 5GS services via a 3GPP access and a non-3GPP access. Process 500 may proceed from 510 to 520.

At 520, process 500 may involve processor 212 performing either a first procedure or a second procedure. The first procedure may involve a number of operations represented by 522 and 524. The second procedure may involve a number of operations represented by 526, 528 and 530.

At 522, process 500 may involve processor 212 detecting either no SIM being inserted in apparatus 210 or a SIM inserted in apparatus 210 being invalid. Process 500 may proceed from 522 to 524.

At 524, process 500 may involve processor 212 entering apparatus 210 into a 5G no-SUPI substate responsive to the detecting.

At 526, process 500 may involve processor 212 performing registration or determination that apparatus 210 is already registered to one or more 5GS services over the non-3GPP access. Process 500 may proceed from 526 to 528.

At 528, process 500 may involve processor 212 detecting an absence of non-3GPP coverage. Process 500 may proceed from 528 to 530.

At 530, process 500 may involve processor 212 entering apparatus 210 into a no access point available substate responsive to the detecting.

In some implementations, in entering apparatus 210 into the 5G no-SUPI substate, process 500 may involve processor 212 performing some operations. For instance, process 500 may involve processor 212 determining that a predefined condition exists. Additionally, process 500 may involve processor 212 operating apparatus 210 in a 5GMM deregistered no-SUPI (5GMM-DEREGISTERED.NO-SUPI) substate for the 3GPP access. In such cases, the predefined condition may include: (i) an access point having been selected for the non-3GPP access; and (ii) either apparatus 210 having no valid subscriber data available or apparatus 210 having an invalid SIM.

In some implementations, in entering apparatus 210 into the 5G no-SUPI substate, process 500 may involve processor 212 performing some operations. For instance, process 500 may involve processor 212 determining that a predefined condition exists. Moreover, process 500 may involve processor 212 operating apparatus 210 in a 5GMM deregistered no-SUPI (5GMM-DEREGISTERED.NO-SUPI) substate for the non-3GPP access. In such cases, the predefined condition may include either apparatus 210 having no valid subscriber data available or apparatus 210 having an invalid SIM.

In some implementations, in an event that the apparatus is not yet registered over the non-3GPP access and is performing the registration, in entering apparatus 210 into the no access point available substate, process 500 may involve processor 212 performing some operations. For instance, process 500 may involve processor 212 performing, for the non-3GPP access, a search for one or more access points in 5GS which results in failure with no 5G core network available over the non-3GPP access and no 5GS service. Furthermore, process 500 may involve processor 212 entering apparatus 210 into a 5GMM deregistered no cell available (5GMM-DEREGISTERED.NO-CELL-AVAILABLE) substate for the non-3GPP access.

In some implementations, in entering apparatus 210 into the no access point available substate, process 500 may involve processor 212 performing some operations. For instance, process 500 may involve processor 212 detecting, for the non-3GPP access, that there is no 5G coverage over the non-3GPP access, no non-3GPP 5G access being available for selection, and no 5GS service. Additionally, process 500 may involve processor 212 entering apparatus 210 into a 5GMM deregistered no access point available (5GMM-DEREGISTERED.NO-CELL-AVAILABLE) substate for the non-3GPP access. In such cases, in entering apparatus 210 into the 5GMM deregistered no access point available substate, process 500 may involve processor 212 entering apparatus 210 into the 5GMM deregistered no access point available substate in an event that N1 mode is enabled and the processor determines to register apparatus 210 in the non-3GPP access when the non-3GPP access becomes available.

In some implementations, in entering apparatus 210 into the no access point available substate, process 500 may involve processor 212 performing some operations. For instance, process 500 may involve processor 212 detecting either that 5G coverage has been lost or that a MICO mode is active in apparatus 210. Moreover, process 500 may involve processor 212 entering apparatus 210 into a 5GMM registered no cell available (5GMM-REGISTERED.NO-CELL-AVAILABLE) substate for the 3GPP access.

In some implementations, in an event that the UE is registered over the non-3GPP access, in entering apparatus 210 into the no access point available substate, process 500 may involve processor 212 performing some operations. For instance, process 500 may involve processor 212 detecting either that there is no 5G coverage over the non-3GPP access or that non-3GPP 5G access cannot be selected. Additionally, process 500 may involve processor 212 entering apparatus 210 into a 5GMM registered no access point available (5GMM-REGISTERED.NO-CELL-AVAILABLE) substate for the non-3GPP access. Moreover, process 500 may involve processor 212 detecting a presence of the non-3GPP coverage. Furthermore, process 500 may involve processor 212 returning apparatus 210 to a registered normal service (REGISTERED.NORMAL-SERVICE) substate responsive to the detecting of the non-3GPP coverage. In such cases, when in the 5GMM registered no access point available substate, a non-3GPP deregistration timer in apparatus 210 may be running as apparatus 210 enters into a 5GMM idle (5GMM-IDLE) mode over the non-3GPP access.

In some implementations, in entering apparatus 210 into the no access point available substate, process 500 may involve processor 212 performing some operations. For instance, process 500 may involve processor 212 enabling 5GS services in apparatus 210. Moreover, when registering, process 500 may involve processor 212 detecting no 5GS service and either that there is no 5G coverage over the non-3GPP access or that non-3GPP 5G access cannot be selected. Furthermore, process 500 may involve processor 212 entering apparatus 210 into a 5GMM deregistered no non-3GPP coverage (5GMM-DEREGISTERED.NO-N3GPP-COVERAGE) substate, a waiting-for-access (WAITING-FOR-ACCESS) substate, a no access point available (5GMM-DEREGISTERED.NO-ACCESS-POINT-AVAILABLE) substate, or a no non-3GPP access point available (NO-N3GPP-ACCESS-POINT-AVAILABLE) substate for the non-3GPP access.

In some implementations, in entering apparatus 210 into the no access point available substate, process 500 may involve processor 212 performing some operations. For instance, when registered, process 500 may involve processor 212 detecting either that there is no 5G coverage over the non-3GPP access or that non-3GPP 5G access cannot be selected. Additionally, process 500 may involve processor 212 entering apparatus 210 into a 5GMM registered no non-3GPP coverage (5GMM-REGISTERED.NO-N3GPP-COVERAGE) substate, a waiting-for-access (WAITING-FOR-ACCESS) substate, a no access point available (NO-ACCESS-POINT-AVAILABLE) substate, or a no non-3GPP access point available (NO-N3GPP-ACCESS-POINT-AVAILABLE) substate for the non-3GPP access.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   controlling, by a processor of an apparatus implemented in a user equipment (UE), a communication device of the apparatus to connect to one or more wireless networks and receive one or more $5^{th}$-Generation System (5GS) services via a non-$3^{rd}$-Generation Partnership Project (non-3GPP) access;
   detecting, by the processor, either no Subscriber Identity Module (SIM) being inserted in the UE or a SIM inserted in the UE being invalid; and
   entering, by the processor, the UE into a 5G no-subscription permanent identifier (no-SUPI) state responsive to the detecting.

2. The method of claim 1, wherein the entering of the UE into the 5G no-SUPI state comprises:
   determining that a predefined condition exists; and
   operating the UE in a 5G Mobility Management (5GMM) deregistered no-SUPI (5GMM-DEREGISTERED.NO-SUPI) state for the non-3GPP access,
   wherein the predefined condition comprises either the UE having no valid subscriber data available or the UE having an invalid SIM.

3. The method of claim 1, wherein the non-3GPP access is via WiFi.

4. The method of claim 1, wherein the 5G no-SUPI state is defined in a non-3GPP access 5G Mobility Management (5GMM) state machine.

5. The method of claim 4, wherein the 5G no-SUPI state is a substate of a main state in the non-3GPP access 5GMM state machine.

6. An apparatus implementable in a user equipment (UE), comprising:
   a communication device configured to communicate wirelessly; and
   a processor coupled to the communication device and configured to perform operations comprising:
      controlling the communication device to connect to one or more wireless networks and receive one or more $5^{th}$-Generation System (5GS) services via a non-$3^{rd}$-Generation Partnership Project (non-3GPP) access;
      detecting, via the communication device, either no Subscriber Identity Module (SIM) being inserted in the UE or a SIM inserted in the UE being invalid; and entering, via the communication device, the UE into a 5G no-subscription permanent identifier (no-SUPI) state responsive to the detecting.

7. The apparatus of claim 6, wherein, in entering the UE into the 5G no-SUPI state, comprises:
   determining that a predefined condition exists; and
   operating the UE in a 5G Mobility Management (5GMM) deregistered no-SUPI (5GMM-DEREGISTERED.NO-SUPI) state for the non-3GPP access,
   wherein the predefined condition comprises either the UE having no valid subscriber data available or the UE having an invalid SIM.

8. The method of claim 6, wherein the non-3GPP access is via WiFi.

9. The method of claim 6, wherein the 5G no-SUPI state is defined in a non-3GPP access 5G Mobility Management (5GMM) state machine.

10. The method of claim 9, wherein the 5G no-SUPI state is a substate of a main state in the non-3GPP access 5GMM state machine.

* * * * *